Dec. 18, 1923.
C. B. ROWLAND
PLANTER
Filed Feb. 8, 1922
1,477,904
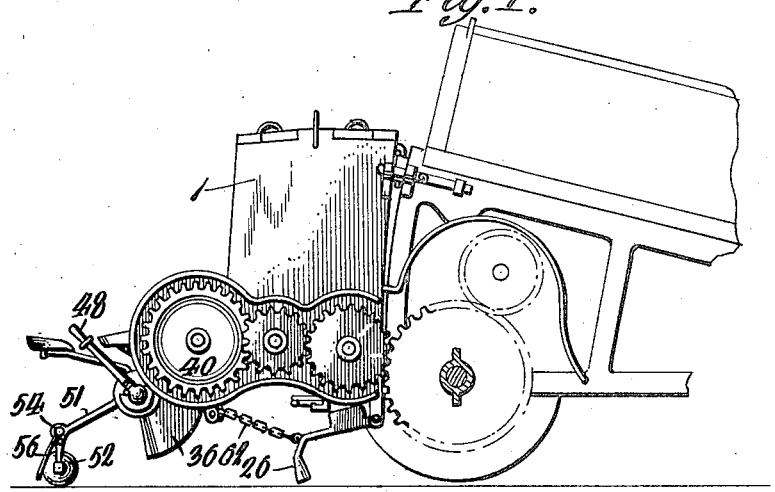
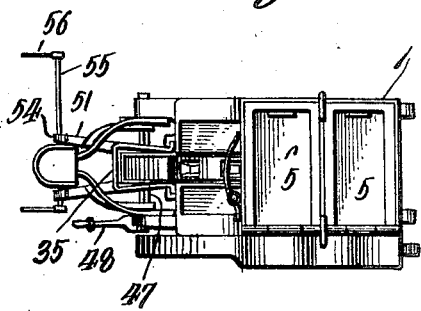
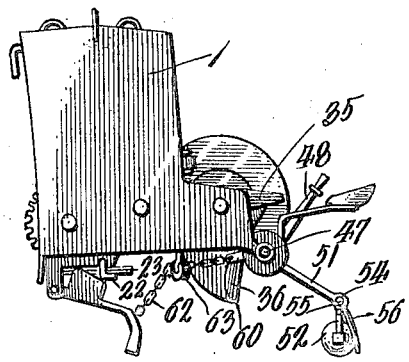

Patented Dec. 18, 1923.

1,477,904

UNITED STATES PATENT OFFICE.

CLIFFORD B. ROWLAND, OF TRENTON, NEW JERSEY.

PLANTER.

Application filed February 3, 1922. Serial No. 534,961.

*To all whom it may concern:*

Be it known that I, CLIFFORD B. ROWLAND, a citizen of the United States, residing at Trenton, in the county of Mercer and State of New Jersey, have invented certain new and useful Improvements in a Planter, of which the following is a specification.

This invention relates to a planter and particularly to a potato planter and has for its principal object to provide means for planting the potatoes at spaced intervals and mixing fertilizer with the soil in which the seeds are planted.

Another object of the invention is to provide a fertilizer and soil mixing device in combination with a seed covering device and means for operating the devices in unison with each other.

A still further object of the invention is to generally improve upon planters of this nature by providing a mechanism which will be extremely and efficient in construction, reliable in operation, and well adapted to the purpose for which it is designed.

With the above and numerous other objects in view as will appear from the description as it progresses, the invention relates to certain novel features of construction, and the combination and arrangement of parts as will be hereinafter more fully described and claimed.

In the drawing:—

Figure 1 is a side elevation of the planter showing the same attached to a tractor device, the tractor device being shown fragmentarily and diagrammatically, Figure 2 is a top plan of the planter, and Figure 3 is a side elevation thereof opposite to that shown in Figure 1.

Referring to the drawings in detail it will be seen that a receptacle 1 forms the larger part of the planter and may be of any desired structure for containing fertilizer and seed. A furrow-forming device 26 is hinged to the forward end of the receptacle. An extension 35 is situated rearwardly of the receptacle and has a depending apron 36 provided thereon which is substantially U-shaped in horizontal cross section so as to guide the seeds and fertilizer to the ground into the ditch made by the furrow-forming device 26. An extension is disposed rearwardly from the extension 35 adjacent the lower end thereof for supporting a shaft 47 so that the same may be rotated by a lever 48. This shaft 47 is preferably square in cross section throughout its main portion or of any other non-circular formation so as to receive the ends of arms 51 which are angular in construction and support the covering disks 52. An eye 54 is situated on each arm 51 preferably at its curved portion and these eyes receive a bar 55 which is slidable therethrough and has mounted at its ends the marker rod 56. It will thus be seen that the position of the marker rods may be varied as is found desirable. A crank 60 is keyed to the shaft 47 preferably adjacent one of the arms 51 so as to be actuated upon rotation of the shaft 47. An eye is situated on the member 26 and a chain 62 is fixed at one end thereto and is trained over a pulley 63 which is suitably journaled. The other end of this chain 62 is attached to the end of the crank 60. It should be noted that this crank 60 extends forwardly whereas the arms 51 extend rearwardly. From this construction it will be seen that when the lever 48 is moved forwardly so as to rotate the shaft 47, referring to Figure 1, in a clock-wise direction that the covering disks 42 will be raised from the ground through the intermediacy of the arms 41 while at the same time the furrow-forming device will be raised through the intermediacy of the chain 62 and crank 60.

I have described my invention in connection with the illustration of its preferred embodiment by way of example only and it is to be understood that numerous changes in form, and in the combination and arrangement of parts may be resorted to without departing from the spirit of the invention as hereinafter claimed.

Having thus described my invention what I claim as new is:—

A planter of the class described including in combination a receptacle, a furrow forming device mounted on the receptacle and movable in respect thereto, an extension formed on the receptacle, a shaft rotatable in the extension, means for rotating the shaft, a seed covering device keyed to the shaft, a crank extending from the shaft, and a chain connected to the crank at one end and to the furrow forming device at its other end whereby the furrow forming device and the seed covering device may be operated in unison with each other.

In testimony whereof I affix my signature in presence of two witnesses.

CLIFFORD B. ROWLAND.

Witnesses:
 FRED F. WEISKOFF,
 HELEN J. WEISKOFF.